US 11,476,782 B2

(12) United States Patent
Itoh (10) Patent No.: US 11,476,782 B2
(45) Date of Patent: Oct. 18, 2022

(54) IMAGE FORMING APPARATUS HAVING MOTOR, AND MOTOR CONTROL APPARATUS FOR CONTROLLING MOTOR (71) Applicant: Canon Kabushiki Kaisha, Tokyo (JP)

(72) Inventor: Masatoshi Itoh, Mishima (JP)

(73) Assignee: Canon Kabushiki Kaisha, Tokyo (JP)

(*) Notice: Subject to any disclaimer, the term of this patent is extended or adjusted under 35 U.S.C. 154(b) by 98 days.

(21) Appl. No.: 17/032,236

(22) Filed: Sep. 25, 2020

(65) Prior Publication Data
US 2021/0099111 A1 Apr. 1, 2021

(30) Foreign Application Priority Data

Sep. 30, 2019 (JP) .............................. JP2019-180716
Feb. 14, 2020 (JP) .............................. JP2020-023664

(51) Int. Cl.
G03G 15/20 (2006.01)
H02P 6/12 (2006.01)
H02P 6/30 (2016.01)
H02P 6/16 (2016.01)

(52) U.S. Cl.
CPC .......... H02P 6/12 (2013.01); G03G 15/2053 (2013.01); H02P 6/16 (2013.01); H02P 6/30 (2016.02)

(58) Field of Classification Search
CPC .. G03G 15/00; G03G 15/432; G03G 15/2032; G03G 15/2053; H02P 6/12; H02P 6/30; H02P 6/16
See application file for complete search history.

(56) References Cited

U.S. PATENT DOCUMENTS 9,389,556 B1 * 7/2016 Kitagawa ........... G03G 15/2032
2017/0036359 A1 * 2/2017 Suda ....................... A01G 3/037

FOREIGN PATENT DOCUMENTS

JP 08223970 A 8/1996
JP 2014177344 A * 9/2014

* cited by examiner

Primary Examiner — Cortez M Cook
(74) Attorney, Agent, or Firm — Venable LLP (57) ABSTRACT An image forming apparatus includes: a motor; a transfer mechanism configured to transfer driving force of the motor to a load; and a control unit configured to control the motor to rotate a rotor of the motor in a first direction to rotate the load. The transfer mechanism has backlash, and the control unit is further configured to, when control to rotate the rotor in the first direction fails, determine whether or not control to rotate the rotor in the first direction failed due to the motor being faulty, by executing control to rotate the rotor a predetermined amount in a second direction opposite to the first direction.

19 Claims, 9 Drawing Sheets

IMAGE FORMING APPARATUS HAVING MOTOR, AND MOTOR CONTROL APPARATUS FOR CONTROLLING MOTOR

BACKGROUND OF THE INVENTION

Field of the Invention

The present invention relates to a motor control technique.

Description of the Related Art

Sensorless types of motors (hereinafter referred to as sensorless motors) without a sensor, such as a Hall element, for detecting the rotor position are used as a driving source of a rotating member in an image forming apparatus. Japanese Patent Laid-Open No. 8-223970 discloses a configuration for detecting a rotor position of a sensorless motor via the induced voltage generated by a coil.

When the sensorless motor is in an inactive state not generating an induced voltage or the like, to detect the rotor position (rotational phase of the rotor) of the sensorless motor, the characteristic of an inductance value of the coil changing depending on the rotor position is used. Specifically, the rotor position can be determined by detecting the inductance value of the coil on the basis of a coil current flowing through the coil when a predetermined voltage is applied to the coil. Also, until the rotor position can be detected from the induced voltage, the motor is driven under forced commutation control, and when the rotor position can be detected from the induced voltage, sensorless drive is switched to. Note that after motor driving has started, in the case in which the rotation speed of the rotor estimated from the coil current is not within a predetermined speed range, activation fails.

In this way, activation failure of the motor can be determined from the rotation speed of the rotor. However, whether the cause of the activation failure was due to motor malfunction or due to an abnormal motor load cannot be discerned from the rotation speed of the rotor.

SUMMARY OF THE INVENTION

According to a disclosure, an image forming apparatus includes: a motor; a transfer mechanism configured to transfer driving force of the motor to a load; and a control unit configured to control the motor to rotate a rotor of the motor in a first direction to rotate the load. The transfer mechanism has backlash, and the control unit is further configured to, when control to rotate the rotor in the first direction fails, determine whether or not control to rotate the rotor in the first direction failed due to the motor being faulty, by executing control to rotate the rotor a predetermined amount in a second direction opposite to the first direction.

Further features of the present invention will become apparent from the following description of exemplary embodiments with reference to the attached drawings.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

Figure 1:
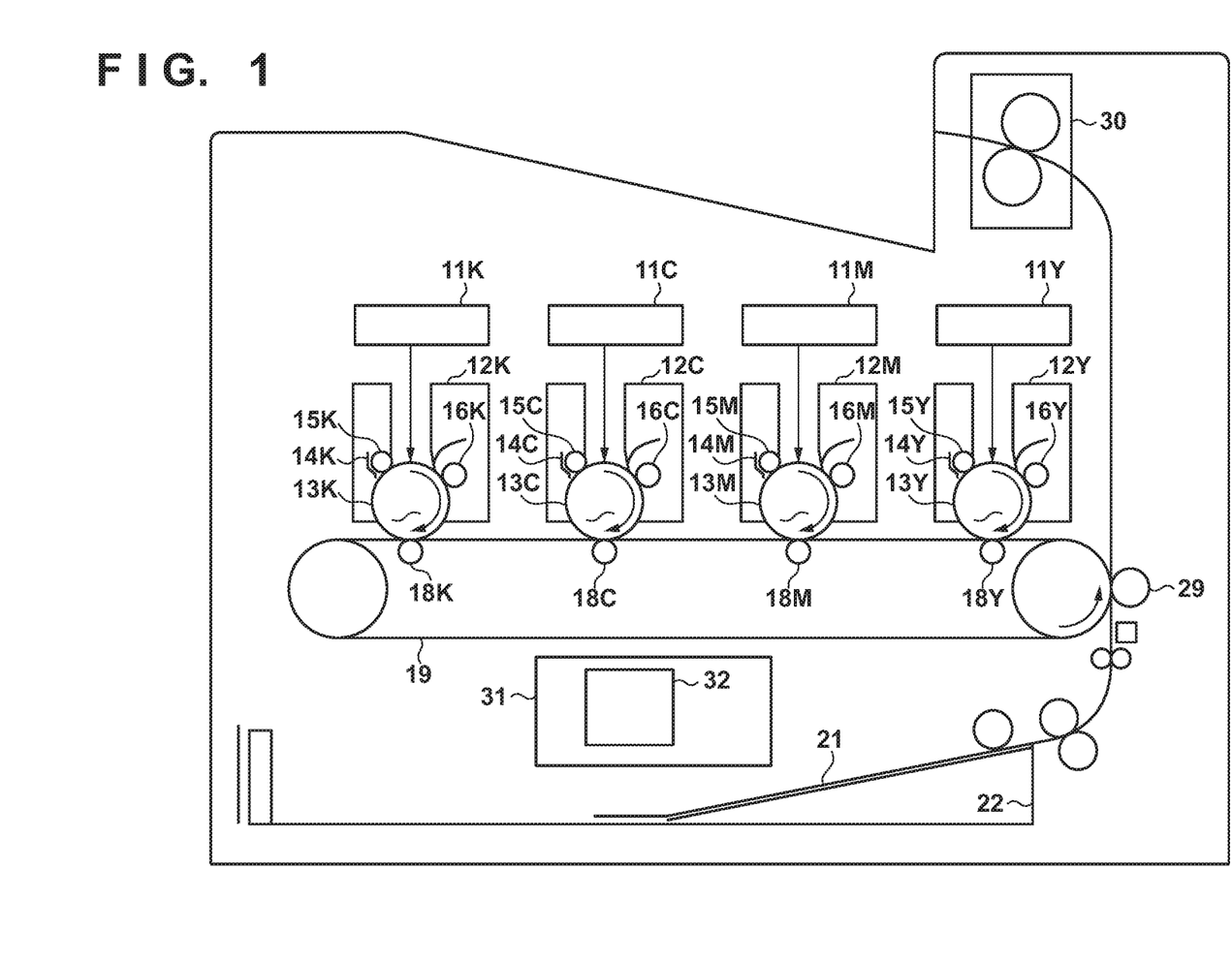
FIG. 1 is a configuration diagram of an image forming apparatus according to an embodiment.

FIG. 1 is a configuration diagram of an image forming apparatus of the present embodiment. The image forming apparatus of FIG. 1 forms a full color image by superimposing toner images of four colors, yellow, magenta, cyan, and black. In FIG. 1, the Y, M, C, and K affixed to the end of the reference signs indicate the color, namely, yellow, magenta, cyan, and black, of the toner image that the member denoted by the reference sign is involved in forming. Note that when the color is not required to be distinguished in the following description, Y, M, C and K are not affixed to the reference sign. A photosensitive member 13 is rotationally driven in the clockwise direction of the drawing when forming an image. A charging roller 15 charges the surface of a corresponding photosensitive member 13 to a uniform electric potential. An exposure unit 11 forms an electrostatic latent image on the photosensitive member 13 by exposing the surface of the corresponding photosensitive member 13 to light. A developing roller 16 of a developing unit 12 develops the electrostatic latent image of the corresponding photosensitive member 13 with a toner to visualize the image as a toner image. With a primary transfer bias, a primary transfer roller 18 transfers the toner image formed on the corresponding photosensitive member 13 to the intermediate transfer belt 19. A cleaner 14 removes the toner not transferred to the intermediate transfer belt 19 remaining on the corresponding photosensitive member 13. Note that a full color image is formed on the intermediate transfer belt 19 by transferring the toner image formed on each photosensitive member 13 in an overlapping manner on the intermediate transfer belt 19.

The intermediate transfer belt 19 is rotationally driven in the anticlockwise direction of the drawing when forming an image. Accordingly, the toner image transferred to the intermediate transfer belt 19 is conveyed to an opposing position of a secondary transfer roller 29. A sheet 21 stored in a cassette 22 is fed along a conveyance path from the cassette 22 via rotation of the rollers provided along the conveyance path and conveyed to the opposing position of the secondary transfer roller 29. With a secondary transfer bias, the secondary transfer roller 29 transfers the toner image of the intermediate transfer belt 19 to the sheet 21. Thereafter, the sheet 21 is conveyed to a fixing unit 30. The fixing unit 30 applies heat and pressure to the sheet 21 to fix the toner image to the sheet 21. After the toner image is fixed, the sheet 21 is discharged to the outside of the image forming apparatus. A control unit 31 including a CPU 32 controls the entire image forming apparatus.

Figure 2:
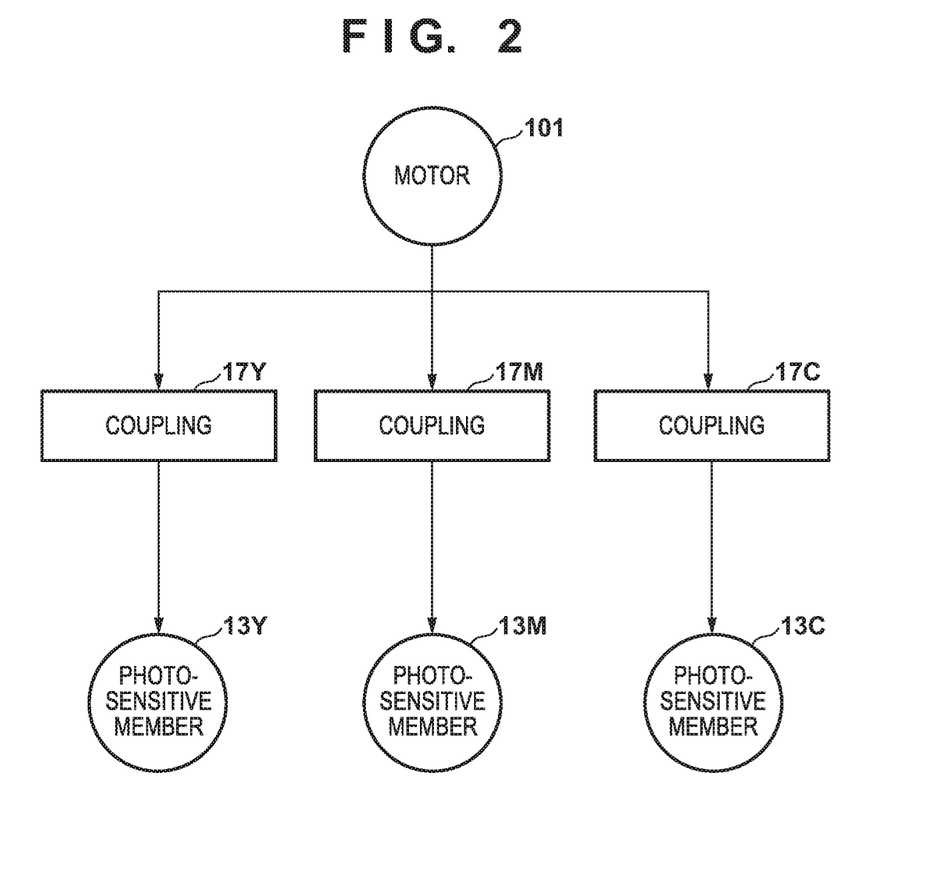
FIG. 2 is a drive configuration diagram of a photosensitive member according to an embodiment.

FIG. 2 illustrates a drive configuration of the photosensitive members 13Y, 13M, and 13C. A drive transmission gear of a motor 101 and drive transmission gears of the photosensitive members 13Y, 13M, and 13C are connected via couplings 17Y, 17M and 17C. Thus, the driving force of the motor 101 is transferred to the photosensitive members 13Y, 13M, and 13C via the couplings 17Y, 17M and 17C. By disconnecting the drive transmission gears of the couplings 17Y, 17M and 17C, the photosensitive members 13Y, 13M, and 13C can be detached from the image forming apparatus. The couplings 17Y, 17M and 17C have backlash so that, when the photosensitive members 13Y, 13M, and 13C are mounted, the photosensitive members 13Y, 13M, and 13C can be smoothly connected to the gears.

Figure 3:
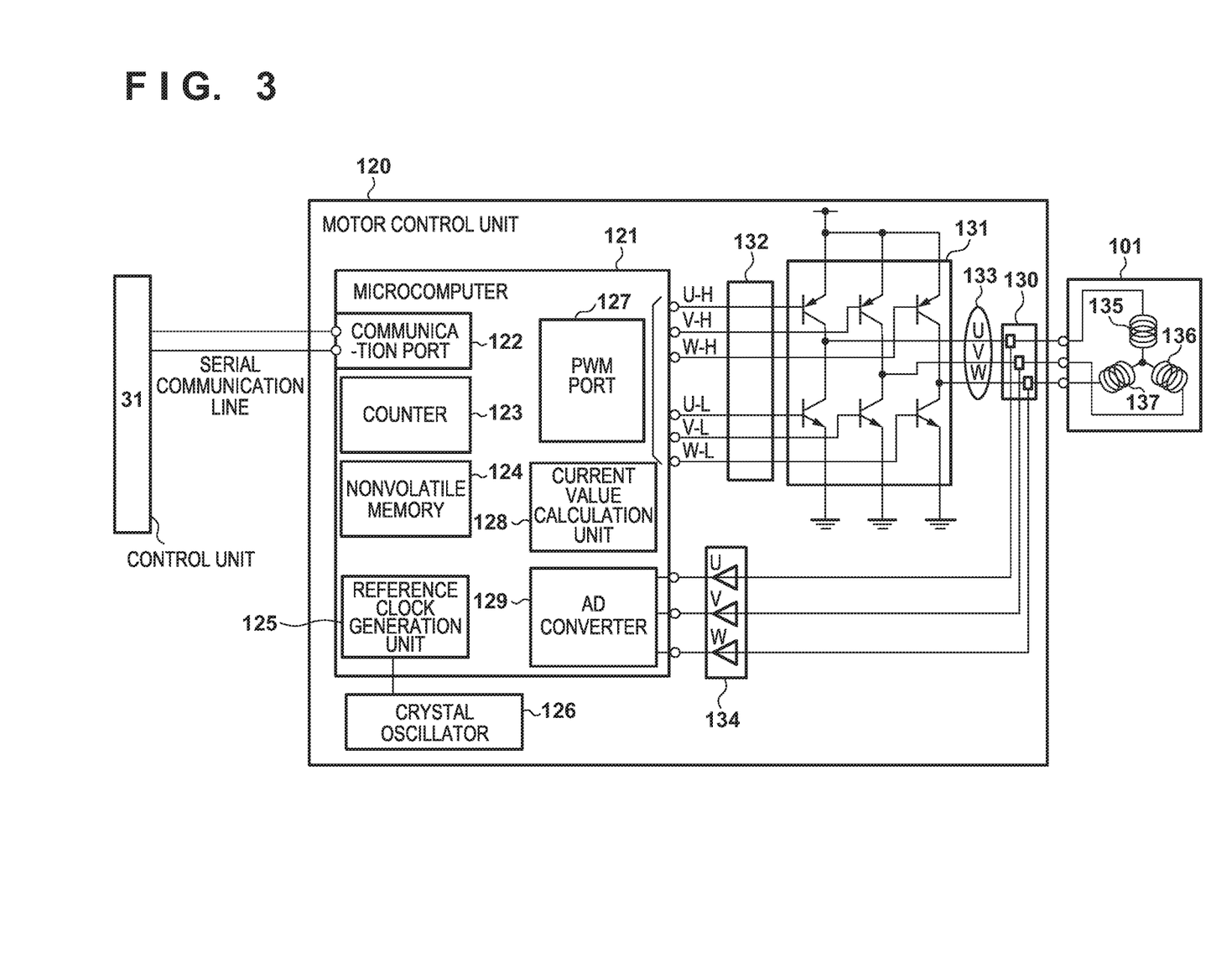
FIG. 3 is a control configuration diagram of a motor according to an embodiment.

FIG. 3 is a control configuration diagram of the motor 101. A motor control unit 120 includes a microcomputer 121. Serial communication with the control unit 31 is carried out through a communication port 122 of the microcomputer 121. The control unit 31 controls the rotation of the motor 101 by controlling the motor control unit 120 using serial communication. A reference clock generation unit 125 generates a reference clock on the basis of the output of a crystal oscillator 126. A counter 123 measures the cycle of the pulse on the basis of the reference clock. A non-volatile memory 124 stores programs used to control the motor and various types of data. The microcomputer 121 outputs a pulse width modulation signal (PWM signal) from a PWM port 127. In the present embodiment, the microcomputer 121, for the three phases (U, V, W) of the motor 101, outputs a total of six PWM signals, namely high-side PWM signals (U-H, V-H, W-H) and low-side PWM signals (U-L, V-L, W-L). Accordingly, the PWM port 127 includes six terminals U-H, V-H, W-H, U-L, V-L, W-L.

The terminals of the PWM port 127 are connected to a gate driver 132, and the gate driver 132 controls the ON and OFF of switching elements of an inverter 131 for three phases on the basis of the PWM signals. Note that the inverter 131 includes a total of six switching elements, namely three high-side switching elements and three low-side switching elements, for the three phases, and the gate driver 132 controls the six switching elements on the basis of the corresponding PWM signals. A transistor or an FET can be used as the switching element, for example. In the present embodiment, when the PWM signal is at a high level, the corresponding switching element is turned on, and when the PWM signal is at a low level, the corresponding switching element is turned off. An output 133 of the inverter 131 is connected to a coil 135 (U phase), a coil 136 (V phase), and a coil 137 (W phase) of the motor 101. By controlling the ON and OFF of the switching elements of the inverter 131, excitation currents (coil currents) of the coils 135, 136, 137 can be controlled. In this way, the microcomputer 121, the gate driver 132, and the inverter 131 function as a voltage control unit that controls the voltages applied to the plurality of coils 135, 136, and 137.

A current sensor 130 outputs detection voltages corresponding to the coil currents that flow through the coils 135, 136, 137. An amplifier unit 134 amplifies the detection voltages of the phases, applies an offset voltage, and outputs the resultant voltages to an analog to digital converter (AD converter) 129. The AD converter 129 converts the amplified detection voltages to digital values. A current value calculation unit 128 determines the coil currents of the phases on the basis of the output values (digital values) of the AD converter 129. For example, assume that the current sensor 130 outputs a voltage of 0.01 V per 1 A, the amplification factor (gain) of the amplifier unit 134 is 10, and the offset voltage applied by the amplifier unit 134 is 1.6 V. In the case in which the coil current flowing through the motor 101 is in the range of −10 A to +10 A, the voltage output from the amplifier unit 134 ranges from 0.6 V to 2.6 V. For example, if the AD converter 129 converts voltages of from 0 to 3 V to digital values of from 0 to 4095 and outputs the converted digital values, excitation currents of from −10 A to +10 A are converted to digital values of approximately from 819 to 3549. Note that in this example, an excitation current flowing in the direction from the inverter 131 to the motor 101 has a positive current value, and an excitation current flowing in the opposite direction has a negative current value.

The current value calculation unit 128 obtains an excitation current by subtracting the offset value corresponding to the offset voltage from the digital value, and multiplying the resultant digital value by a predetermined conversion factor. In the present example, the offset value corresponding to the offset voltage (1.6 V) is approximately 2184 (1.6×4095/3). Also, the conversion factor is approximately 0.000733 (3/4095). In this way, the current sensor 130, the amplifier unit 134, the AD converter 129, and the current value calculation unit 128 constitute a current detection unit.

Figure 4A:
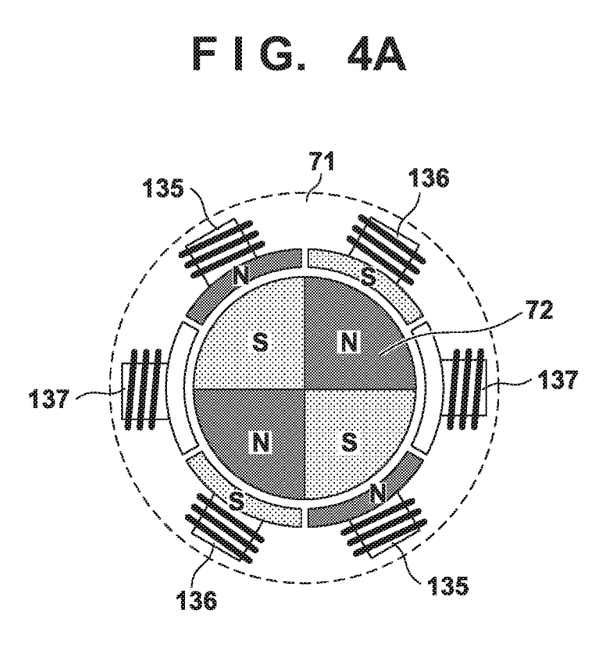
FIGS. 4A and 4B are configuration diagrams of a motor according to an embodiment.
Figure 4B:
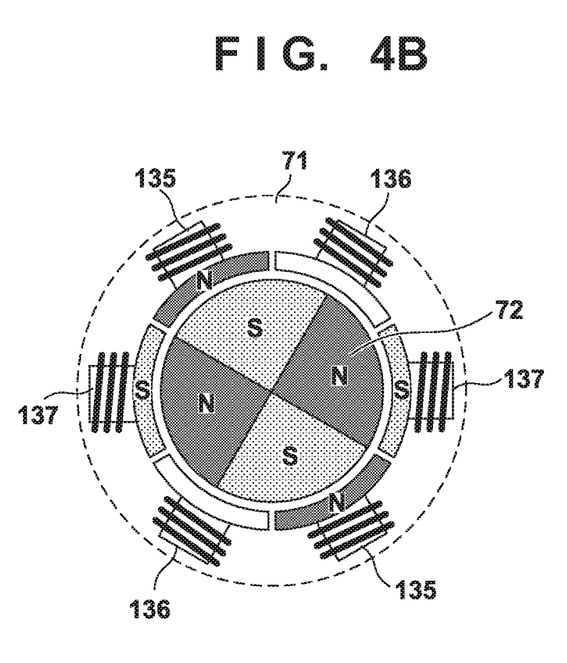

FIGS. 4A and 4B are configuration diagrams of the motor 101. The motor 101 is a sensorless motor. The motor 101 includes a stator 71 having six slots and a rotor 72 having four poles. The stator 71 is provided with the U-phase, V-phase, and W-phase coils 135, 136, 137. The rotor 72 is constituted by permanent magnets, and includes two sets of N and S poles. The stop position of the rotor 72 is determined depending on the combination of the excited coils 135, 136, 137, in other words, the excitation phase. Note that, as the rotor 72 is a rotating body, the position of the rotor 72 is also the rotational phase of the rotor 72. For example, when the coils are excited such that the coil current flows from the U-phase coil 135 to the V-phase coil 136, the rotor 72 stops at the position illustrated in FIG. 4A. Note that in this example, when the coil current flows from the U-phase coil 135 to the V-phase coil 136, the U phase is an N pole and the V phase is an S pole. Then, when the coils are excited such that the coil current flows from the U-phase coil 135 to the W-phase coil 137, the U phase is an N pole and the W phase is an S pole. Then, the rotor 72 stops at the position illustrated in FIG. 4B.

Hereinafter, two phases that are excited are referred to as an excitation phase. Note that when the excitation phase is an X-Y phase, the coil current flows from the X-phase coil to the Y-phase coil and the coils are excited. Note that, in this case, the X phase is an N pole and the Y phase is an S pole. When the driving of the motor 101 is stopped and the coil current stops flowing, force to hold the rotor 72 is no longer exerted. In this state, if an external force is applied to the rotor 72, the rotor 72 rotates. Also, when the image forming apparatus is powered on, the image forming apparatus cannot determine the stop position of the rotor 72. Thus, when the rotation of the motor 101 is started under forced commutation control, the image forming apparatus needs to detect the stop position of the rotor 72 first.

Typically, the coil has a configuration in which a copper wire is wound around a core formed from stacked electromagnetic steel sheets. Here, the magnetic permeability of the electrical steel sheets decreases when an external magnetic field is present. Accordingly, the inductance of a coil, which is proportional to the magnetic permeability of a core, also decreases when an external magnetic field is present. For example, as illustrated in FIG. 4A, when the U-phase coil 135 opposes only an S pole of the rotor 72, because the effect of the external magnetic field produced by the rotor 72 is great, the degree of reduction in inductance of the U-phase coil 135 is great. Note that when an external magnetic field is present, in the case in which the direction of the magnetic field produced by the coil current is the same as the direction of the external magnetic field, the amount of reduction in inductance is greater than in the case in which the direction is opposite to the direction of the external magnetic field. In the state illustrated in FIG. 4A, because the U phase opposes the S pole of the rotor 72, the amount of reduction in inductance in the case in which the coil current flows in the direction of the N pole relative to the U phase is greater than in the case in which the coil current flows in the direction of the S pole relative to the U phase.

Figure 5A:
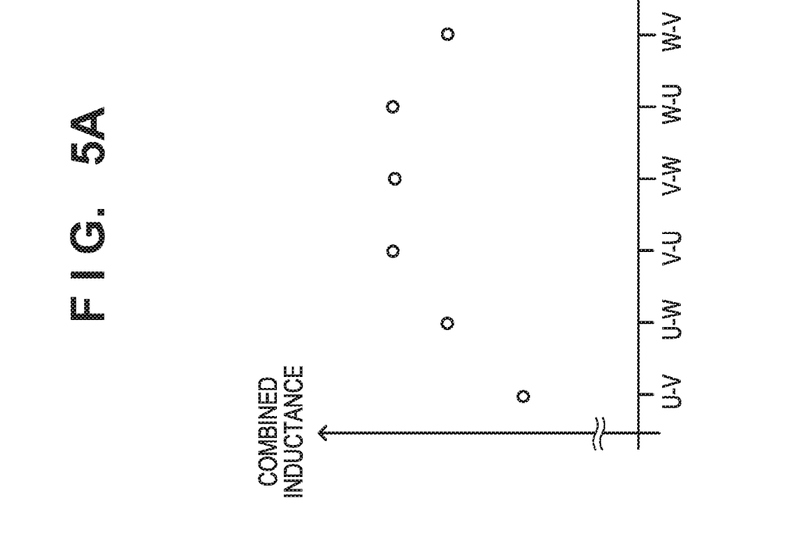
FIG. 5A is a diagram illustrating the relationship between excitation phase and combined inductance.

However, in the state illustrated in FIG. 4A, an intermediate portion between the S pole and the N pole of the rotor 72 opposes the W-phase coil 137. Thus, the effect of the external magnetic field produced by the rotor 72 is small, and the degree of reduction in inductance is small. In this way, depending on the stop position of the rotor 72, the inductance of the U-phase coil 135, the V-phase coil 136, and the W-phase coil 137 changes. FIG. 5A illustrates an example of the combined inductance at each excitation phase when excited in the case in which the rotor 72 is stopped in the state illustrated in FIG. 4A. Note that hereinafter, the stop position of the rotor 72 when the X-Y phase is excited is referred to as the "X-Y phase position".

Because the rotor 72 is stopped at the U-V phase position, as illustrated in FIG. 5A, the combined inductance at the U-V phase when excited is the lowest. Thus, by exciting each of the excitation phases and comparing the obtained combined inductance at each of the excitation phases, the stop position of the rotor 72 can be determined. Hereinafter, exciting the excitation phases, obtaining the combined inductance at the excitation phases, and determining the relative magnitude relationship is referred to as relative value detection processing.

In the present embodiment, all six of the excitation phases are sequentially excited and the coil current after a predetermined amount of time is measured to determine the combined inductance. The lower the combined inductance, the faster the rise in coil current. Thus, in the case in which the rotor 72 is stopped at the U-V phase position, the coil current of the U-V phase after a predetermined amount of time from excitation is greater than that of other excited excitation phases. Note that the rotor 72 is assumed to be stopped between two excitation phases adjacent in terms of the electrical angle, in other words, between the U-V phase position and the U-W phase position. In this case, the value of the coil current of the U-V phase after a predetermined amount of time after excitation and the value of the coil current of the U-W phase after a predetermined amount of time after excitation are approximately equal and are greater than that of other excited excitation phases. In the present embodiment, if the coil current of one of the excitation phases when excited is greater than the coil currents of the other excitation phases when excited, it is determined that the rotor 72 is stopped at the position of that one excitation phase. Also, if the coil currents of two adjacent, in terms of the electrical angle, excitation phases when excited are approximately equal and are greater than that of the other excited excitation phases, it is determined that the rotor 72 is stopped at an intermediate position between the two excitation phases.

Figure 5B:
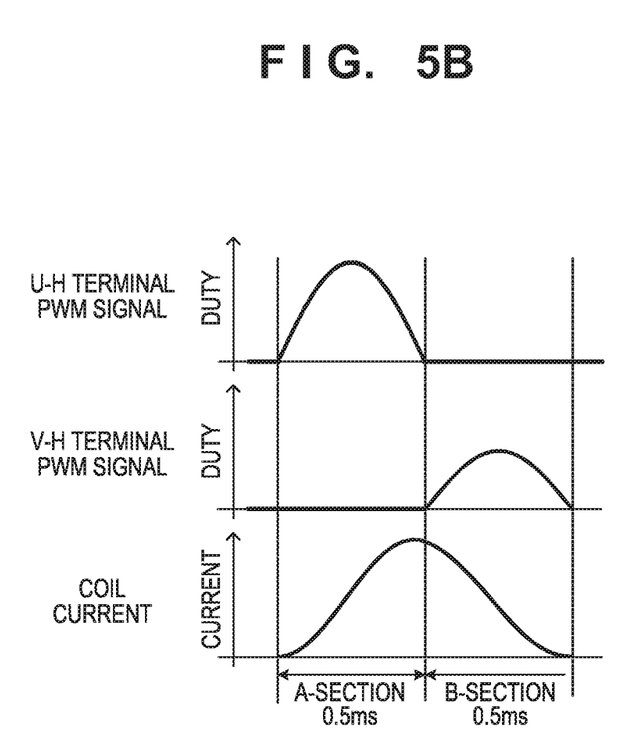
FIG. 5B is a diagram illustrating a method for detecting combined inductance.

The relative value detection processing of the present embodiment will be described in detail below. For example, in the case in which the U-V phase is excited, PWM signals that change in duty as illustrated in FIG. 5B are outputted from the U-H terminal and the V-H terminal of the PWM port 127. Specifically, in an A section (0.5 ms), the duty of the PWM signal output from the U-H terminal is changed like a half sine wave. Note that the maximum value of the duty is 80%, for example. In this section, the V-L terminal is at a high level (duty 100%) and other terminals are at a low level (duty 0%). In a B section (0.5 ms) following the A section, the duty of the PWM signal output from the V-H terminal is changed like a half sine wave. In this section, the U-L terminal is at a high level (duty 100%) and other terminals are at a low level (duty 0%). The period of time of the A section and the B section in the present embodiment is set to 0.5 ms to ensure detection accuracy and so that the rotor 72 is not rotated. The maximum duty value of the A section is set so that enough coil current flows to ensure sufficient detection accuracy. Also, the maximum duty value of the B section is set such that the integrated value over time of a voltage generated in the inductance component of the coil in the A section and the B section is approximately zero. In this way, as illustrated in FIG. 5B, the coil current in B section smoothly attenuates, with the coil current becoming roughly 0 at the end of the B section.

Figure 6:
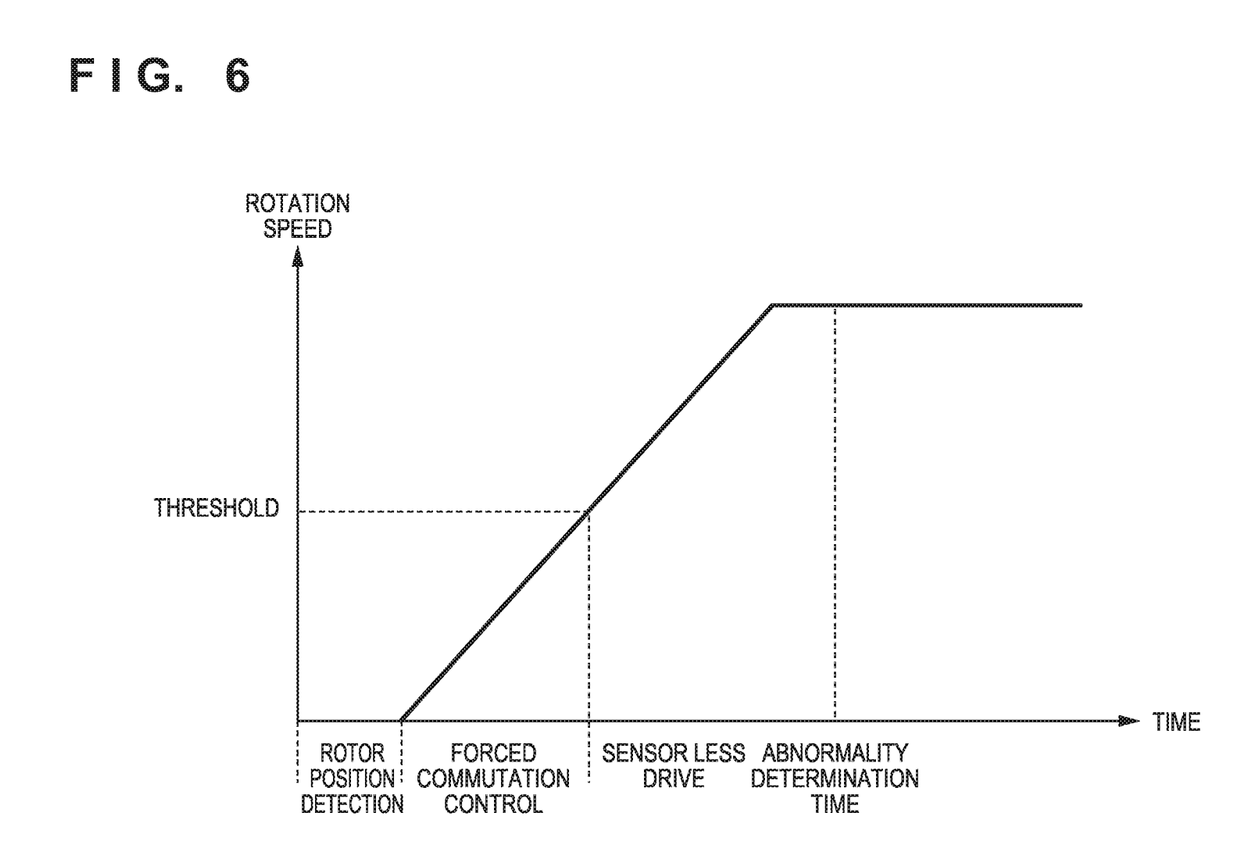
FIG. 6 is an explanatory diagram of a motor activation process according to an embodiment.

FIG. 6 is an explanatory diagram of the processing for activating the motor 101. Note that hereinafter, the rotation direction of the rotor 72 for rotating the photosensitive members 13Y, 13M, and 13C in the rotation direction when forming an image is referred to as the forward direction, and the direction opposite to the forward direction is referred to as the reverse direction. First, the control unit 31 executes relative value detection processing and detects the stop position of the rotor 72. When the stop position of the rotor 72, in other words, the initial position when rotation starts, is detected, the control unit 31 executes forced commutation control on the basis of the initial position and rotates the rotor 72 in the forward direction. Under forced commutation control, the control unit 31 gradually speeds up the switching between the excitation phases, and thus increases the rotation speed of the rotor 72. When the rotation speed of the rotor 72 reaches a predetermined threshold, the motor control unit 120 switches from forced commutation control to sensorless drive. In sensorless drive, the position of the rotor 72 and the rotation speed are estimated on the basis of the induced voltage. Note that in the period of time under forced commutation control, the control unit 31 determines the rotation speed of the rotor 72 on the basis of the speed at which excitation phases are switched between. The control unit 31, at an abnormality determination timing, detects the rotation speed of the rotor 72, and, if the detected rotation speed of the rotor 72 is less than a predetermined speed, the control unit 31 determines that activation of the motor 101, in other words, control to rotate the rotor 72 in the forward direction, was a failure. Note that at the abnormality determination timing, the control unit 31 executes control to rotate the rotor 72 at a rotation speed greater than the predetermined speed.

In this way, activation failure of the motor 101 can be detected by the control unit 31 from the rotation speed of the rotor 72. However, whether the cause of the activation failure was due to the motor 101 malfunctioning or due to an abnormal load on the motor 101 cannot be discerned. As described with reference to FIG. 2, the couplings 17Y, 17M, 17C have backlash. Thus, the rotor 72 can be rotated in the reverse direction, within the backlash amount, without the driving force of the motor 101 transferring to the load. In other words, if the motor 101 functions normally, the rotor 72 can be rotated in the reverse direction by a rotation amount within the backlash amount. However, if the motor 101 is faulty, the rotor 72 cannot be rotated in the reverse rotation direction. In the present embodiment, at the abnormality determination timing, if activation of the motor 101 fails, cause identification process, described below, is executed using the characteristic described above.

Figure 7:
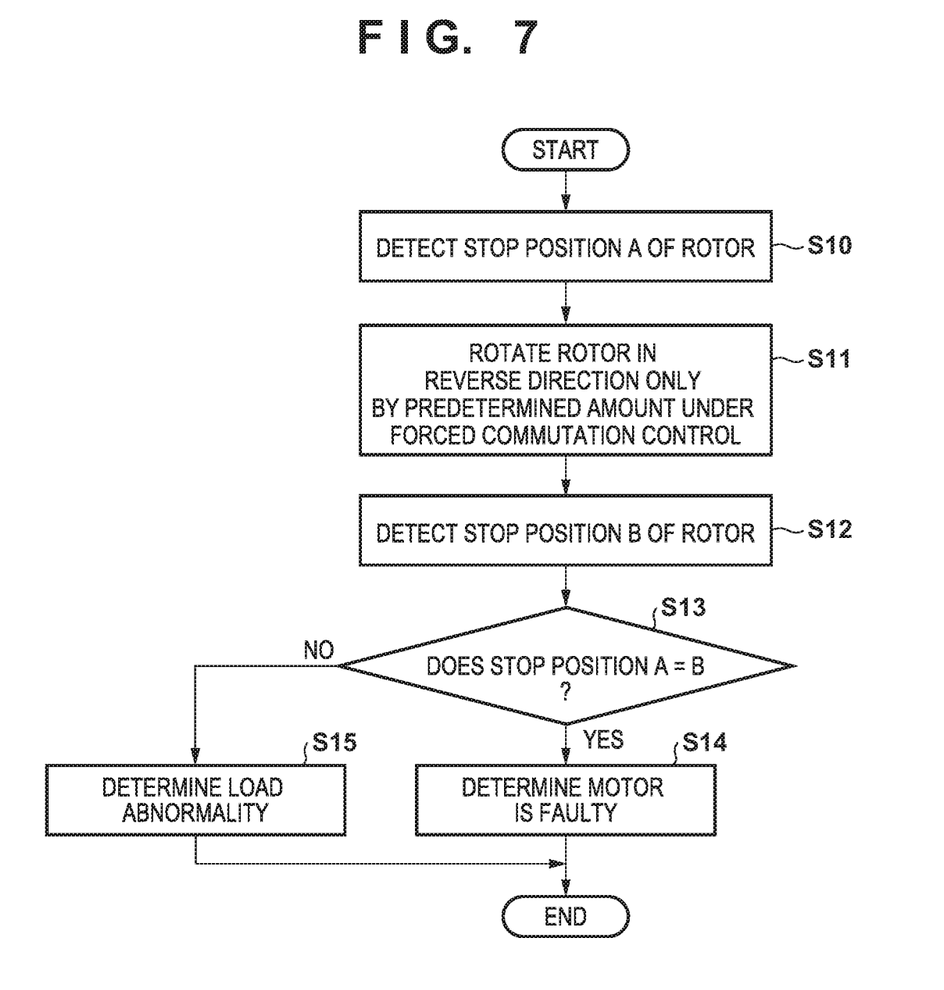
FIG. 7 is a flowchart of cause identification process according to an embodiment.

FIG. 7 is a flowchart of the cause identification process of the present embodiment. In step S10, the control unit 31 executes relative value detection processing and detects a stop position A of the rotor 72. In step S11, the control unit 31 rotates the rotor 72 in the reverse direction by a predetermined amount under forced commutation control. The rotation amount in the reverse direction is less than or equal to the backlash amount of the couplings 17Y, 17M, 17C. In other words, the rotation amount in the reverse direction is an amount such that the driving force of the motor 101 is not transferred to the loads, i.e., the photosensitive members 13Y, 13M, and 13C, and the load of the motor 101 is roughly 0. Also, the rotation amount in the reverse direction is set such that the stop position of the rotor 72 after rotation in the reverse direction is not the stop position A. In step S12, the control unit 31 executes relative value detection processing and detects a stop position B of the rotor 72. In step S13, the control unit 31 determines whether or not the stop position A and the stop position B are the same. If the stop position A and the stop position B are the same, meaning that the rotor 72 has not rotated, the control unit 31 determines that the motor 101 is faulty in step S14. If the stop position A and the stop position B are not the same, the motor control unit 120 determines that there is a load abnormality, in other words, that the photosensitive members 13Y, 13M, and 13C are faulty in step S15.

According to the process of FIG. 7, the control unit 31 can determine whether the cause of the activation failure of the motor 101 was due to the motor 101 malfunctioning or due to a load abnormality of the motor 101. Then, a user can be notified by the control unit 31 to replace the loads, i.e., the photosensitive members 13Y, 13M, 13C or to replace the motor 101 depending on the determination result.

In this way, by providing backlash in the transfer mechanism for transferring the driving force of the motor 101 to the load, even if the rotor 72 is rotated in the reverse direction by the backlash amount, the driving force is not transferred to the load. In other words, in this configuration, the motor 101 is able to rotate in the reverse direction by the backlash amount with substantially no load. Then, if activation of the motor 101 fails, the rotor 72 is rotated in the reverse direction by a predetermined amount within the backlash amount, and whether or not the rotor 72 rotates in the reverse direction is determined. With this configuration, whether the activation failure of the motor 101 was due to a load abnormality or due to the motor 101 itself malfunctioning can be determined. Note that in the present example, the couplings 17Y, 17M, 17C have backlash. However, the present invention is not limited to this configuration. Specifically, backlash need only be provided in the transfer mechanism for transferring the driving force of the motor 101 to the load (photosensitive member).

Note that in step S13 of FIG. 7, if the stop position A and the stop position B are the same, the motor 101 is determined to be faulty. In the other cases, load abnormality is determined to be the cause. However, a configuration may be employed in which, if the difference (phase difference) between the stop position A and the stop position B is less than a predetermined value, the motor 101 is determined to be faulty, and in the other cases, load abnormality is determined to be the cause. Note that in this case, the predetermined amount of rotation in the reverse direction in step S11 is set to an amount that makes the phase difference between the stop position A and the stop position B greater than or equal to the predetermined value.

Also, a configuration can be employed in which whether or not the motor 101 is faulty is determined by: assuming that the rotor 72, at the stop position A, has been rotated in the reverse direction by the predetermined amount, mathematically obtaining a stop position Z of the rotor 72 after rotation in the reverse direction, and comparing the actual stop position B detected in step S12 and the stop position Z. In this case, if the phase difference between the stop position Z and the stop position B is greater than or equal to the predetermined value, the motor is determined to be faulty. If the phase difference is less than the predetermined value, load abnormality is determined to be the cause. Note that in this case, the predetermined amount of rotation in the reverse direction in step S11 is set to a value greater than or equal to the predetermined value.

Second Embodiment

Figure 8:
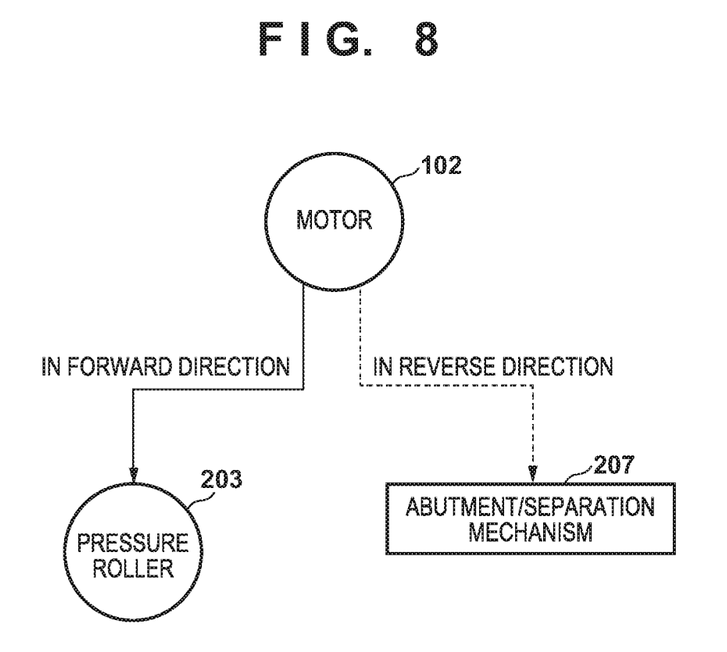
FIG. 8 is a drive configuration diagram of a fixing unit according to an embodiment.

Next, a second embodiment will be described, focusing on the points that differ from the first embodiment. FIG. 8 is a diagram illustrating a drive configuration of the fixing unit 30. The fixing unit 30 includes a heating roller and a pressure roller 203. The heating roller rotates in accordance with the rotation of the pressure roller 203. A motor 102, via a driving force transfer mechanism, transfers this driving force to the pressure roller 203 and an abutment/separation mechanism 207. Note that, in this configuration, when the motor 102 rotates in the forward direction, the transfer mechanism transfers this driving force to the pressure roller 203. When the motor 102 rotates in the reverse direction, the transfer mechanism transfers this driving force to the abutment/separation mechanism 207. The abutment/separation mechanism 207 has a configuration in which a non-illustrated cam operates in accordance with the rotation of the motor 102 and the fixing unit 30 is set to an abutment state in which the pressure roller 203 is abutted against the heating roller or a separated state in which the pressure roller 203 is separated from the heating roller. Note that whether the fixing unit 30 is in the abutment state or the separated state is detected by a non-illustrated sensor. When the image forming apparatus is powered OFF or transitions to sleep mode, the fixing unit 30 is put in the separated state. This reduces deterioration in the heating roller and thus helps to prevent image defects caused by a faulty heating roller. Note that the configuration of the motor 102 and the control configuration thereof are similar to the configuration of the motor 101 and the control configuration thereof, and thus description thereof is omitted.

Figure 9:
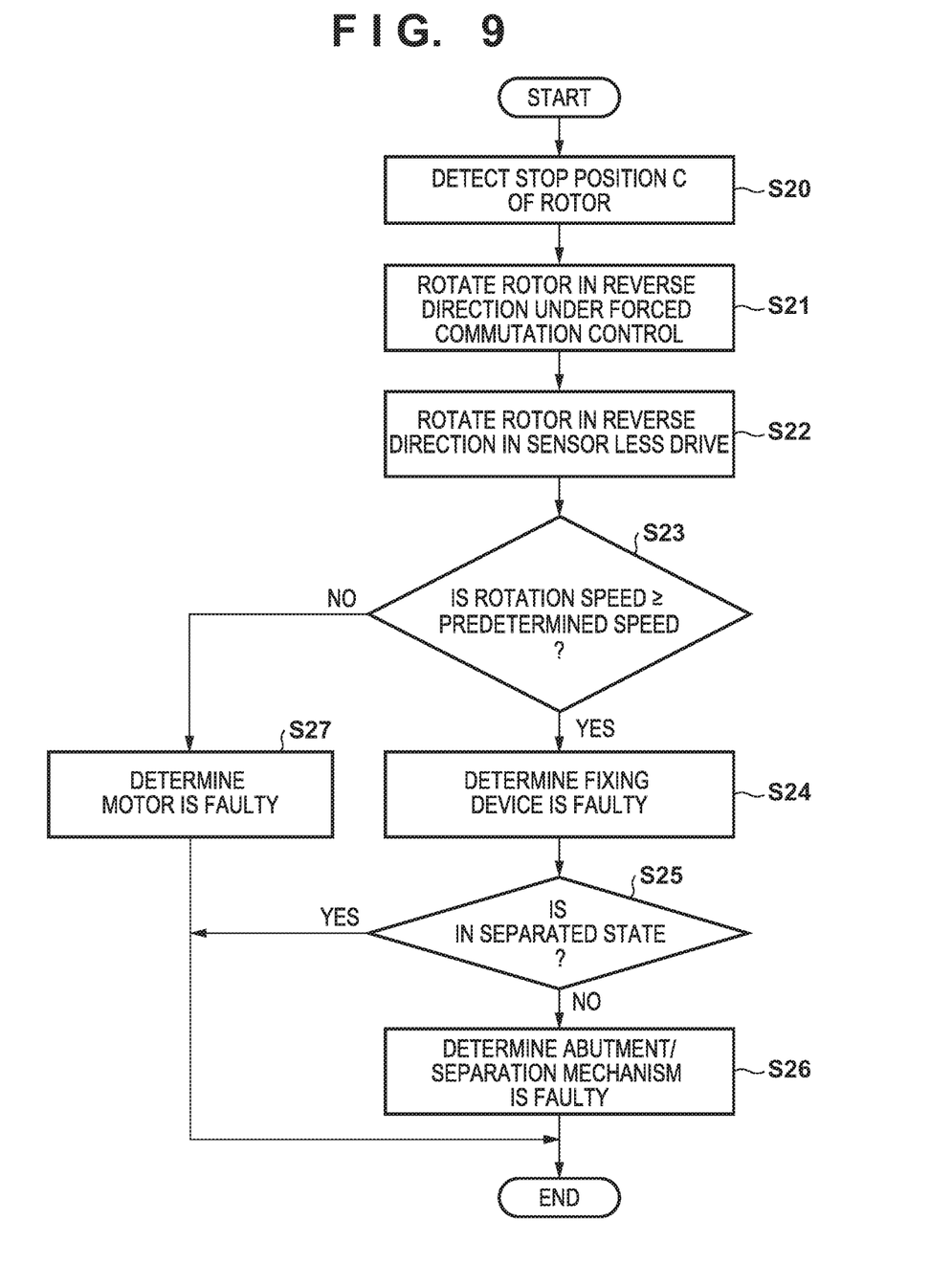
FIG. 9 is a flowchart of cause identification process according to an embodiment.

FIG. 9 is a flowchart of the cause identification process of the present embodiment. In step S20, the control unit 31 executes relative value detection processing and detects a stop position C of the rotor 72. In step S21, the control unit 31, under forced commutation control, rotates the rotor 72 in the reverse direction, and in step S22, when the rotation speed of the rotor 72 reaches a value greater than or equal to a threshold, the control unit 31 rotates the rotor 72 in the reverse direction in sensorless drive. In step S23, the control unit 31 determines whether the rotation speed of the rotor 72 is greater than or equal to a predetermined speed. In other words, in the process from step S20 to step S23, the same process of determining activation failure when the rotor 72 is rotated in the forward direction is executed for when the rotor 72 is rotated in the reverse direction. Note that the predetermined speed for determining the activation failure does not need to be the same for the forward direction and the reverse direction.

In step S23, if the rotation speed of the rotor 72 is not greater than or equal to the predetermined speed, in step S27, the control unit 31 determines that the motor 102 is faulty. However, in step S23, if the rotation speed of the rotor 72 is greater than or equal to the predetermined speed, in step S24, the control unit 31 determines that the fixing unit 30 is faulty. Furthermore, in step S25, the control unit 31 determines whether the fixing unit 30 is in the separated state using a non-illustrated sensor. If the fixing unit 30 is in the separated state, the control unit 31 determines that the fixing unit 30 is faulty and that the abutment/separation mechanism 207 is functioning normally. However, if the fixing unit 30 cannot be put in the separated state, in step S26, the control unit 31 determines that the abutment/separation mechanism 207 as well as the fixing unit 30 is faulty.

The transfer mechanism is configured such that the driving force is transferred to different loads depending on the rotation direction of the motor 102. Also, if activation fails in both directions, the motor 102 is determined to be faulty. In contrast, in the case in which activation fails in one rotation direction but is successful in the other rotation direction, the rotating load when the motor 102 is rotated in the one rotation direction is determined to be abnormal. With this configuration, whether the activation failure of the motor 102 was due to a load abnormality or due to the motor 102 itself malfunctioning can be determined.

Others

Note that in the first embodiment, the load is a photosensitive member, and in the second embodiment, the load is the fixing unit 30 and the abutment/separation mechanism 207. However, the load is not limited thereto. Specifically, the configuration of the first embodiment can be applied to a discretionary load, as long as a transfer mechanism can be used that is configured such that rotation with substantially no load can be executed for a predetermined amount in the reverse direction. Specifically, the configuration of the second embodiment can be applied to a discretionary load, as long as a transfer mechanism can be used that is configured such that the driving force is transferred to different loads depending on the rotation direction. Also, in the embodiments described above, at the abnormality determination timing, if the predetermined rotation speed has not been reached, activation is determined to have failed. However, another configuration may be employed in which activation failure is determined by another criteria.

Also, in the embodiments described above, the image forming apparatus was used as an example. However, the present invention can be applied to a discretionary apparatus that uses the transfer mechanism described above to transfer the driving force of the motor to a load. Furthermore, the present invention can be embodied as a motor control apparatus that uses the transfer mechanism described above to control the motor that transfers the driving force to a load. The motor control apparatus includes the motor control unit 120 of FIG. 3 and a functional block involved in motor control of the control unit 31. Also, the present invention can be embodied as a method for controlling a motor in the motor control apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-180716, filed Sep. 30, 2019 and Japanese Patent Application No. 2020-023664, filed Feb. 14, 2020, which are hereby incorporated by reference herein in their entirety.

What is claimed is:

1. An image forming apparatus comprising:
a motor;
a transfer mechanism configured to transfer driving force of the motor to a load; and
a control unit configured to control the motor to rotate a rotor of the motor in a first direction to rotate the load,
wherein the transfer mechanism has backlash, and
the control unit is further configured to, when control to rotate the rotor in the first direction fails, determine whether or not control to rotate the rotor in the first direction failed due to the motor being faulty, by executing control to rotate the rotor a predetermined amount in a second direction opposite to the first direction.

2. The image forming apparatus according to claim 1, wherein the predetermined amount is less than or equal to a backlash amount of the backlash.

3. The image forming apparatus according to claim 2, wherein the control unit is further configured to determine that the motor is faulty when a phase difference between a rotational phase of the rotor before being rotated in the second direction and a rotational phase of the rotor after being rotated in the second direction is less than a predetermined value.

4. The image forming apparatus according to claim 3, wherein the predetermined amount is an amount to make the phase difference greater than or equal to the predetermined value.

5. The image forming apparatus according to claim 2, wherein the control unit is further configured to determine that the motor is faulty when a phase difference between a rotational phase of the rotor after being rotated in the second direction and a rotational phase of the rotor in the case of assuming the rotor has been rotated by the predetermined amount in the second direction is greater than or equal to a predetermined value.

6. The image forming apparatus according to claim 5, wherein the predetermined amount is an amount greater than or equal to the predetermined value.

7. The image forming apparatus according to claim 1, wherein the control unit is further configured to determine that the load is faulty when, according to a result of executing control to rotate the rotor by the predetermined amount in the second direction, the motor is not determined to be faulty.

8. The image forming apparatus according to claim 1, wherein the control unit determines that control to rotate the rotor in the first direction has failed when, after executing control to rotate the rotor in the first direction at a rotation speed greater than a predetermined speed and detecting a rotation speed of the rotor, the detected rotation speed of the rotor is less than the predetermined speed.

9. The image forming apparatus according to claim 1, wherein the load is photosensitive member.

10. The image forming apparatus according to claim 1, wherein the transfer mechanism includes a coupling; and the backlash is provided in the coupling.

11. An image forming apparatus comprising:
a motor;
a transfer mechanism configured to transfer driving force of the motor to a first load when a rotor of the motor is rotating in a first direction and transfer driving force of the motor to a second load different from the first load when the rotor is rotating in a second direction opposite to the first direction; and
a control unit configured to control the motor,
wherein the control unit is further configured to, when control to rotate the rotor in the first direction fails, determine whether or not control to rotate the rotor in the first direction failed due to the motor being faulty by executing control to rotate the rotor in the second direction and determining whether or not control to rotate the rotor in the second direction fails.

12. The image forming apparatus according to claim 11, wherein the control unit is further configured to determine that the motor is faulty when control to rotate the rotor in the second direction fails.

13. The image forming apparatus according to claim 12, wherein the control unit is further configured to determine that the first load is faulty when control to rotate the rotor in the second direction does not fail.

14. The image forming apparatus according to claim 11, wherein the control unit is further configured to determine that control to rotate the rotor in the first direction has failed when, after executing control to rotate the rotor in the first direction at a rotation speed greater than a first predetermined speed and detecting a rotation speed of the rotor, the detected rotation speed of the rotor is less than the first predetermined speed.

15. The image forming apparatus according to claim 11, wherein the control unit is further configured to determine that control to rotate the rotor in the second direction has failed when, after executing control to rotate the rotor in the second direction at a rotation speed greater than a second predetermined speed and detecting a rotation speed of the rotor, the detected rotation speed of the rotor is less than the second predetermined speed.

16. The image forming apparatus according to claim 11, wherein the first load is a pressure roller of a fixing unit that includes a heating roller and the pressure roller; and
the second load is an abutment/separation portion configured to set the fixing unit to an abutment state in which the pressure roller is abutted against the heating roller or a separated state in which the pressure roller is separated from the heating roller.

17. The image forming apparatus according to claim 16, further comprising:
a detection portion configured to detect whether the fixing unit is in the abutment state or the separated state,
wherein the control unit is further configured to determine that the first load and the second load are faulty when, in a case in which control to rotate the rotor in the second direction does not fail, the state of the fixing unit is unchanged.

18. A motor control apparatus for controlling a motor configured to transfer driving force to a load via a transfer mechanism having backlash, the motor control apparatus being configured to:
rotate a rotor of the motor in a first direction to rotate the load,
determine whether control to rotate the rotor in the first direction has failed, and
in response to control to rotate the rotor in the first direction being determined to have failed, determine whether or not control to rotate the rotor in the first direction failed due to the motor being faulty by executing control to rotate the rotor by a predetermined amount in a second direction opposite to the first direction.

19. A motor control apparatus for controlling a motor configured to transfer driving force to a first load and a second load via a transfer mechanism,
wherein the transfer mechanism is configured to transfer the driving force to the first load when a rotor of the motor rotates in a first direction and transfer the driving force to the second load when the rotor rotates in a second direction opposite to the first direction,
the motor control apparatus being configured to:
rotate the rotor in the first direction to rotate the first load,
determine whether control to rotate the rotor in the first direction failed, in response to control to rotate the rotor in the first direction being determined to have failed, execute control to rotate the rotor in the second direction, and determine whether or not control to rotate the rotor in the first direction failed due to the motor being faulty by determining whether control to rotate the rotor in the second direction failed.

\* \* \* \* \*